(12) United States Patent
Sandberg

(10) Patent No.: US 6,517,340 B2
(45) Date of Patent: Feb. 11, 2003

(54) MOLD PLATE HAVING MULTIPLE ROWS OF CAVITIES FOR FOOD PATTY-MOLDING APPARATUS

(75) Inventor: Glenn Sandberg, Lockport, IL (US)

(73) Assignee: Formax, Inc., Mokena, IL (US)

( * ) Notice: Subject to any disclaimer, the term of this patent is extended or adjusted under 35 U.S.C. 154(b) by 147 days.

(21) Appl. No.: 09/791,044

(22) Filed: Feb. 22, 2001

(65) Prior Publication Data

US 2002/0115402 A1 Aug. 22, 2002

(51) Int. Cl.⁷ ............................................. B29C 45/32
(52) U.S. Cl. ........................ 425/572; 425/574; 425/575
(58) Field of Search .................................. 425/546, 556, 425/572, 574, 575, 812

(56) References Cited

U.S. PATENT DOCUMENTS

| | | |
|---|---|---|
| 3,887,964 A | 6/1975 | Richards |
| 4,182,003 A | 1/1980 | Lamartino et al. |
| 4,187,581 A * | 2/1980 | Wagner ....................... 425/575 |
| 4,272,864 A | 6/1981 | Holly |
| 4,334,339 A * | 6/1982 | Holly ......................... 425/562 |
| 4,356,595 A | 11/1982 | Sandberg et al. |
| 4,372,008 A | 2/1983 | Sandberg |
| 4,418,446 A | 12/1983 | Sandberg et al. |
| 4,597,135 A | 7/1986 | Holly et al. |
| 4,768,941 A | 9/1988 | Wagner |
| 4,821,376 A | 4/1989 | Sandberg |
| 4,872,241 A | 10/1989 | Lindee |
| 5,730,650 A | 3/1998 | Soper |

OTHER PUBLICATIONS

Admitted Prior Art: 1971 "F–26 Original Double Row".

* cited by examiner

Primary Examiner—Tim Heitbrink
(74) Attorney, Agent, or Firm—Polit & Associates, LLC

(57) ABSTRACT

A mold plate assembly for a patty-forming apparatus includes a reciprocating mold plate having patty-forming cavities, with at least two rows of cavities aligned in a longitudinal direction, and a fill plate arranged facing the mold plate. The mold plate reciprocates between a cavity fill position and a patty discharge or knock-out position. Fill slots are arranged through the fill plate to fill food product into said mold cavities when the mold plate is in the fill position. A valve plate is provided facing the fill plate and having valve openings corresponding to the fill openings of the fill plate. The valve plate is reciprocated between an open and a closed position, to fill food product into the mold cavities when the mold plate is in the fill position, and the valve plate is in an open position, or to prevent flow through the fill openings when the valve plate is in the closed position. The valve plate allows for the use of multiple rows of cavities in the mold plate and ensures consistent filling in both the rearward and forward rows of cavities.

27 Claims, 10 Drawing Sheets

MOLD PLATE HAVING MULTIPLE ROWS OF CAVITIES FOR FOOD PATTY-MOLDING APPARATUS

TECHNICAL FIELD OF THE INVENTION

The present invention relates to food patty-molding machines. The invention particularly relates to food patty-molding machines which incorporate a reciprocating mold plate having patty-forming cavities which are cyclically filled to form patties, and then emptied, the patties being discharged to a patty-receiving area.

BACKGROUND OF THE INVENTION

Food patty-forming or molding machines are described, for example, in U.S. Pat. Nos. 3,887,964; 4,372,008 and 4,821,376. A typical food patty-forming machine or apparatus 20 is illustrated in FIG. 1. This machine is described in detail in U.S. Pat. No. 3,887,964 and has been marketed as the FORMAX 26 machine by Formax, Inc., of Mokena, Ill. Molding machine 20 includes a machine base 21 which supports the operating mechanisms of the machine and contains hydraulic actuating systems, electrical actuating systems, and most of the machine controls.

The food patty-molding machine 20 includes a supply means 24 for storing and supplying a moldable food product, such as ground beef, fish, pork, chicken, potatoes, or the like, to the processing mechanisms of the machine. Supply means 24 includes a large food product storage hopper 25 that supplies a food pump system 26. System 26 includes two alternately operating food pumps (one shown); other machines typically include only a single food pump. The two food pumps continuously pump food, under pressure, into a valve manifold connected to a cyclically operable molding station 28. Molding station 28 includes a multi-cavity mold plate 32 that moves cyclically between a fill position, shown in FIG. 1, and a discharge position in which its mold cavities are outside of station 28, aligned with a set of knock-out cups 33.

Food supply means 24 includes a conveyor belt 31 that extends completely across the bottom of hopper 25. In FIG. 1, a limited supply of food product 38 is shown in hopper 25; a much greater supply could be stored in the hopper without exceeding its capacity. The forward end of hopper 25 communicates with a vertical hopper outlet 39 that leads downwardly into two pump chambers; only one pump chamber 69 is shown. Three motors drive three vertical feed screws. Only one motor 47 and one feed screw 53 are shown in FIG. 1.

The upper part of a pump housing 71 comprises a plate 81 that supports the mold plate 32. The mold plate 32 includes a plurality of individual mold cavities 86 distributed in a single row across the width of the mold plate; mold cavities 86 are alignable with the manifold outlet fill passage 79. A mold cover 82 is disposed immediately above mold plate 32, closing off the top of each of the mold cavities 86. The mold cover 82 may include a conventional breather plate. Suitable spacers (not shown) are provided to maintain the spacing between the cover 82 and the support plate 81, essentially equal to the thickness of the mold plate 32. A housing 88 is positioned over the cover plate 82. The housing 88 encloses the operating mechanism (not shown) for the knock-out cups 33.

In the operation of the patty-molding machine 20, a supply of ground meat or other moldable food product 38 is placed into the hopper 25, and is advanced toward the hopper outlet 39 by the conveyor 31. Whenever one of the food pump plungers, such as the plunger 68, is retracted to expose a pump cavity (e.g., the cavity 69), the vertical feed screws 53 aligned with that pump cavity are actuated to feed the food product into the pump cavity.

In FIG. 1, pumping system 26 is illustrated with the mold plate 32 in its fill position, and with the pump 61 pumping the moldable food product through the manifold 27. The pump 61, as shown, has just begun its pumping stroke, and has compressed the food product in pump cavity 69, forcing it under pressure into the manifold 27. As operation of the machine 20 continues, the plunger 68 advances and food product flows into the mold cavities 126, there is a relatively constant pressure on the food product and chamber 69, manifold 27, fill passage 79, and cavities 86.

In describing the operation of molding mechanism 28, and particularly the mold plate 32, it is convenient to start with the mold plate 32 in the fill position in FIG. 1. In each molding cycle, mold plate 32 remains in this fill position for a limited dwell interval. As the mold cavities 86 move into the fill position, one of the two food pumps of machine 20 pumps food product through manifold 27 and fill passage 79, filling the mold cavities. To assure complete filling of the mold cavities, the food pump must apply a substantial pressure to the food product.

Following the fill dwell interval, mold plate 32 is moved outwardly, to the right from its fill position, as shown in FIG. 1, until it reaches a discharge position with its mold cavities 86 aligned with knock-out cups 33. As mold plate 32 moves toward its discharge position, mold cavities 86 all move clear of fill passage 79 before any part of those cavities projects out of mold station 28, beyond support plate 81 and cover 82. Thus, the food pump in machine 20, as shown in FIG. 1, remains sealed off at all times. A second dwell interval occurs at the discharge position of mold plate 32, during which knock-out cups 33 move downwardly through the mold cavities, discharging the molded food patties onto a patty-receiving area, e.g. a take off conveyor (not shown).

Following discharge of the molded food patties, mold plate 32 is moved back toward its fill position so that mold cavities 86 can again be filled with food product. Again, mold cavities 86 are completely inside molding mechanism 28, sealed off, before they come into alignment with fill passage 79.

Although a single fill passage 79 is shown in FIG. 1, it is also known to provide multiple fill orifices which together are substantially coextensive with the area of the cavities, such as described in U.S. Pat. Nos. 4,356,595; 4,821,376 and 4,372,008.

The present inventor has recognized that the throughput (quantity of patties per time period of machine operation), of food patties formed by the aforementioned food patty-forming machine is limited by the speed of the machine and the number of cavities that can be aligned across the single row. The present inventor has recognized that it would be desirable that the throughput of such a machine be increased, while maintaining a consistent quality of the patties formed by such a machine.

SUMMARY OF THE INVENTION

The present invention provides an improved food patty-forming apparatus of the aforementioned type having a reciprocating mold plate, and which includes two or more rows of cavities, for example, forward and rearward rows, which are substantially aligned along a reciprocation direction of the mold plate. The two or more rows of cavities are filled with food product from two or more corresponding forward and rearward rows of fill openings, which communicate food product through one face side of the respective cavities. A valve plate is arranged to reciprocate between an open and closed position, to control food product flow between food product fill openings and the cavities.

According to the invention, the valve plate reciprocates to open the two rows of cavities to respective two rows of fill openings in a synchronized fashion such that the two rows of cavities are supplied with food product in identical, consistent fashion. In this regard, the rearward row of cavities is not thereby exposed to the open forward fill openings during retraction of the rearward cavities during mold plate reciprocation. Thus, the forward row of cavities is exposed to only the open forward fill openings during the filling interval; and the rearward row of cavities is exposed to only the open rearward fill openings during the filling interval. In this way, the rearward row of cavities which pass over the forward fill openings is not over-filled or over-pressured by being exposed to the forward fill openings before or after filling by the corresponding rearward fill openings.

According to the invention, the production of food patties by the patty-forming apparatus per operating period is effectively doubled compared to an apparatus with only a single row of mold cavities. Each row of cavities is filled simultaneously without any row of cavities being over-filled, or over-pressured. The resultant food patties will have a consistent quality and density, and a resultant consistent cooking time.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
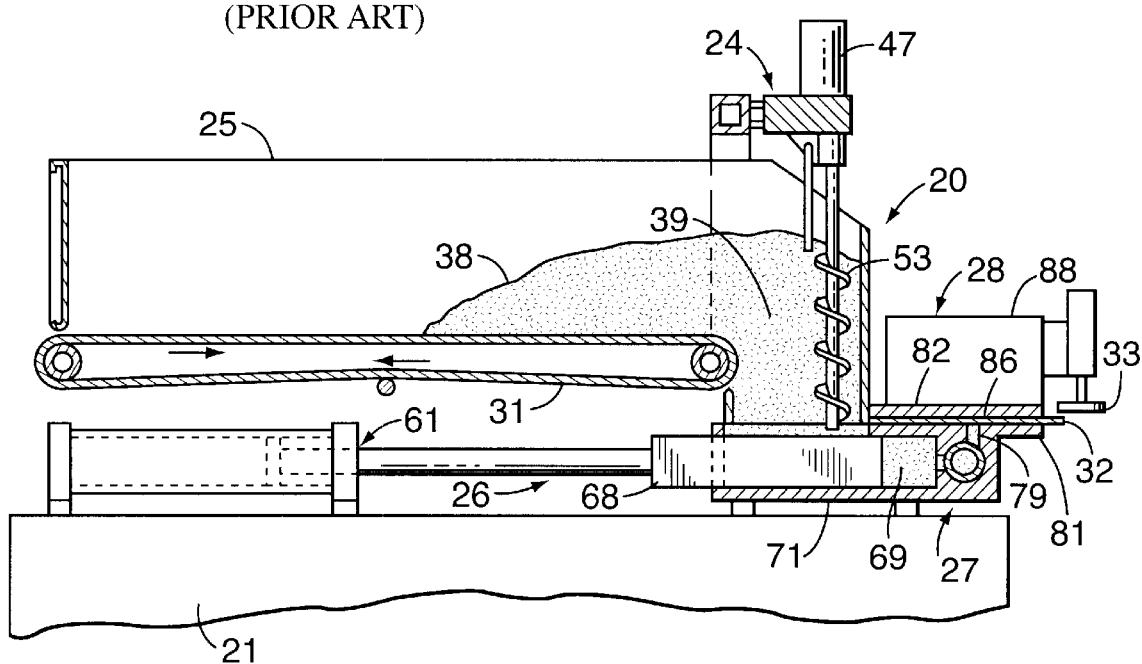
FIG. 1 is a diagrammatic sectional view of a prior art food patty-molding machine.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
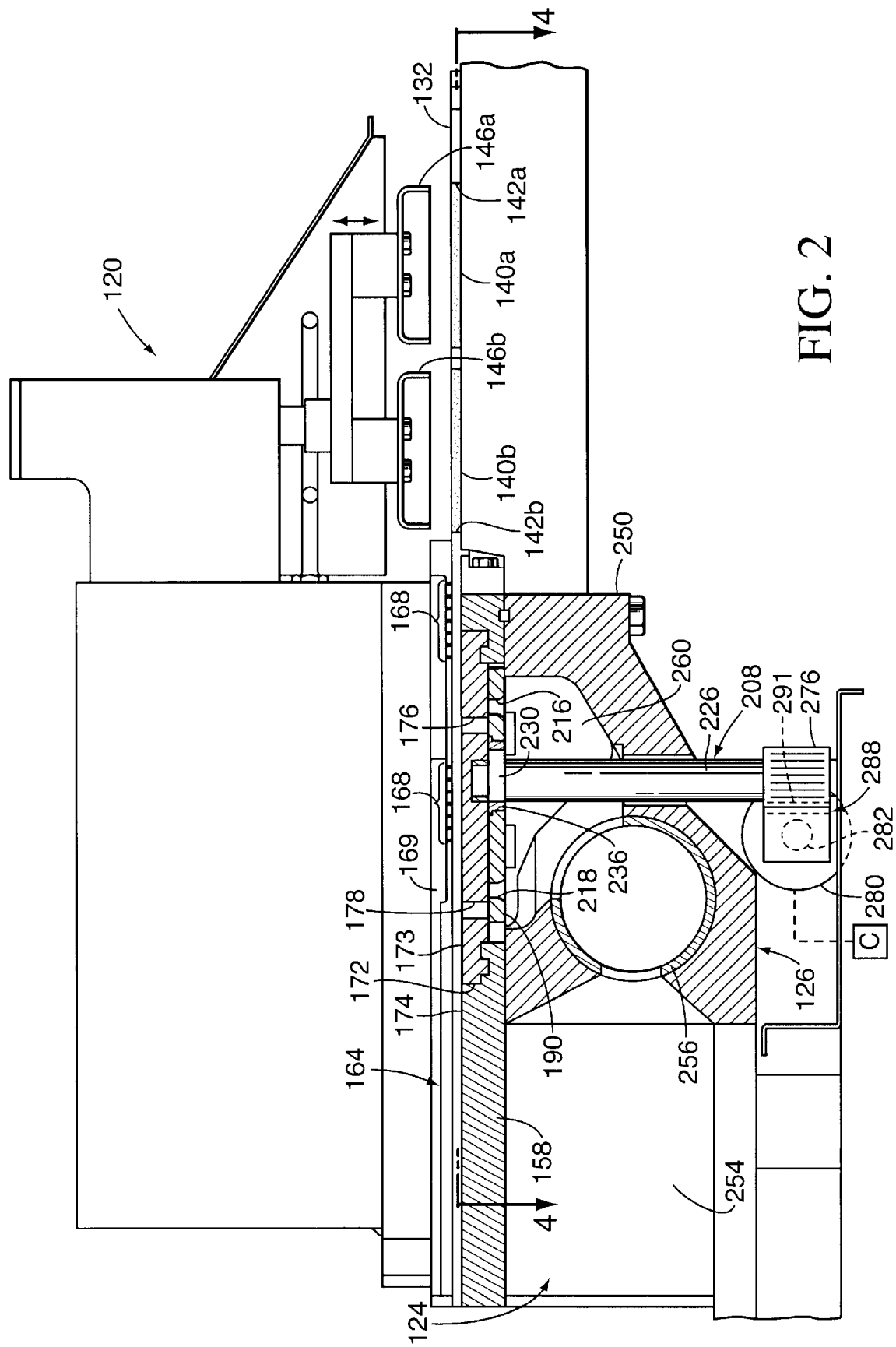
FIG. 2 is a diagrammatic sectional view of a food patty-forming apparatus according to the present invention, with the apparatus mold plate in a knock-out position.

FIG. 2 illustrates a food patty-forming apparatus 120 of the present invention. Except as otherwise described herein, the apparatus 120 is of a type such as described in U.S. Pat. Nos. 3,887,964; 4,372,008 and 4,821,376, herein incorporated by reference.

Figure 7:
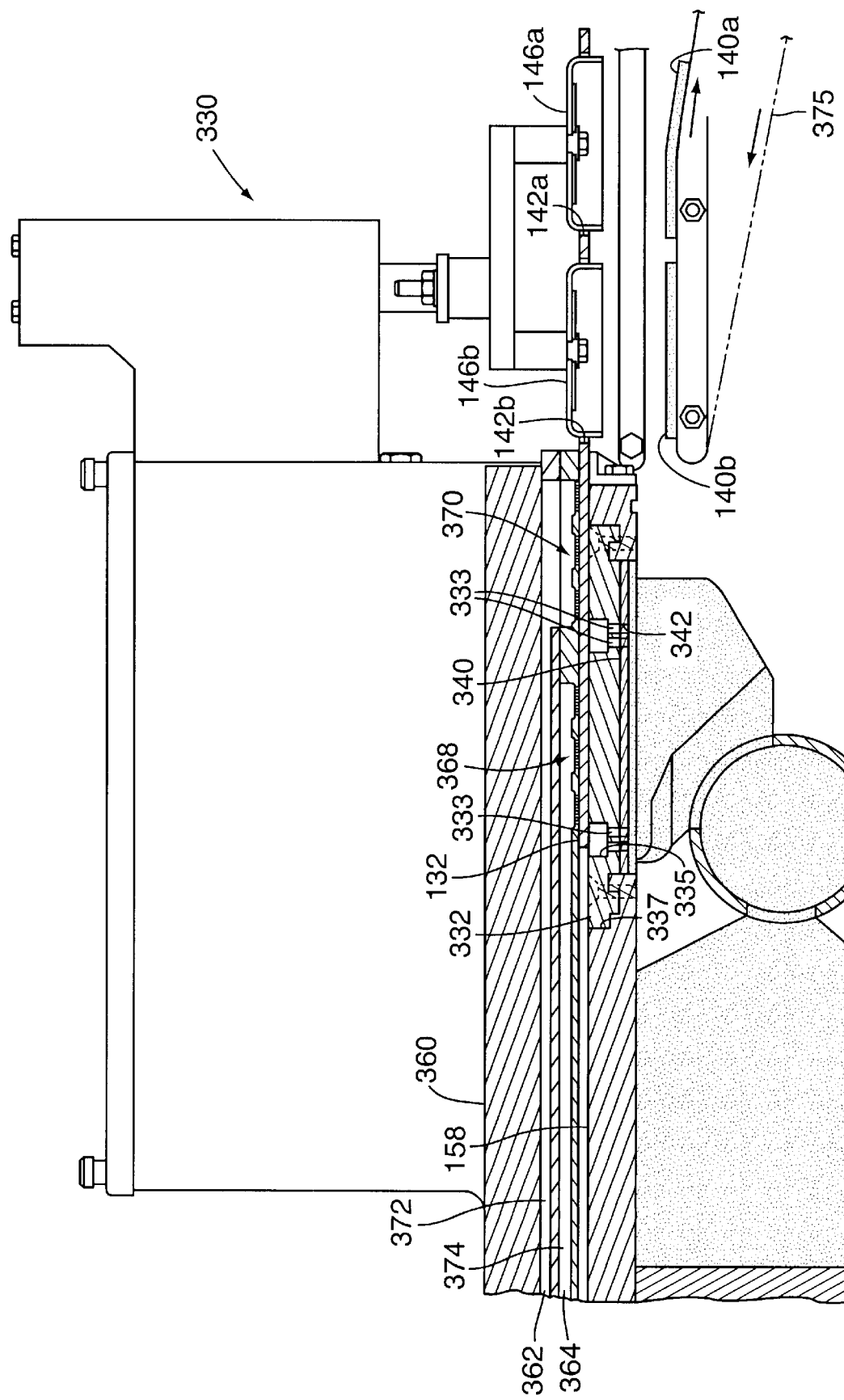
FIG. 7 is a diagrammatic sectional view of an alternate embodiment food patty-forming apparatus according to the present invention, with the apparatus mold plate in a knock-out position.

The apparatus 120 includes a supply apparatus 124 for storing and supplying a moldable food product, such as ground beef, fish, pork, chicken, potatoes, or the like to the processing mechanism of the apparatus. The supply apparatus 124 includes a storage hopper (not shown) and a food pump system 126. The supply apparatus can be as disclosed in U.S. Pat. Nos. 4,356,595 and 4,372,008 herein incorporated by reference. The apparatus includes a mold plate 132 that moves cyclically between a discharge or knock-out position shown in FIG. 2 and a fill position shown in FIG. 3. In the discharge position, two rows of food patties 140a, 140b which occupy two rows of mold cavities, front mold cavities 142a, and rear mold cavities 142b, respectively, within the mold plate 132, are discharged by downward movement of two rows of knock-out cups 146a, 146b, respectively. The food patties can be delivered to a take-off conveyor such as shown in FIG. 7.

The mold plate 132 is guided for reciprocation between a support plate 158 and a cover plate or breather plate 164. The cover plate 164 provides breather holes 168 and an associated air channel 169 flow connected to the breather holes for allowing the expulsion of air during filling of the two rows of mold cavities 142a, 142b. Breather hole locations and patterns are disclosed in the patent application. "Improved Patty-Forming Mold Plate Assembly," U.S. Ser. No. 09/545,804; filed Apr. 8, 2000, and herein incorporated by reference.

A fill plate 172 is fit within the support plate 158 and includes a top surface 173 which is planar with a contiguous top surface 174 of the support plate 158. The fill plate 172 includes a forward row of fill openings, such as fill slots 176, and a rearward row of fill openings, such as fill slots 178, where "forward" and "rearward" refer to the reciprocation direction L of the mold plate 132 from the fill position toward the discharge position.

A valve plate 190 is arranged beneath the fill plate 172. The valve plate 190 is reciprocatable along the reciprocation direction L of the mold plate 132. In this regard, a pair of reciprocation mechanisms 208 are used to precisely reciprocate the valve plate 190. The valve plate 190 includes forward and rearward rows of valve openings such as forward valve slots 216, and rearward valve slots 218. The slots are oblong in the transverse direction, having substantially the same size and shape as corresponding overlying fill slots. The valve slots include flared bottom edges. In the valve plate position shown in FIG. 2, the slots 216, 218 are effectively closed at their top ends by the fill plate 172.

Each reciprocation mechanism 208 includes a vertically disposed shaft 226 which has a horizontally disposed cam 230 connected thereto at top end of the shaft 208. The cam 230 is positioned within a circular bearing 236 fit within the valve plate 190. Rotation of the shaft 226 causes rotation of the cam 230 and reciprocation of the valve plate 190. In a preferred embodiment, the shaft 226 is oscillated over an arc of 180°, rather than being continuously rotated.

A housing 250 of the food product delivery system 126 underlies and supports the support plate 158. Food product is pumped under pressure through a delivery channel 254, and then through a valve cylinder 256. Food product from the valve cylinder is pressurized into an expanded fill passage 260. In the discharge position shown in FIG. 2, no food product can be delivered from the fill passage 260 through the valve plate 190 due to the solid features of the overhead fill plate 172, when the mold plate 132 is in its discharge or knock-out position.

Figure 3:
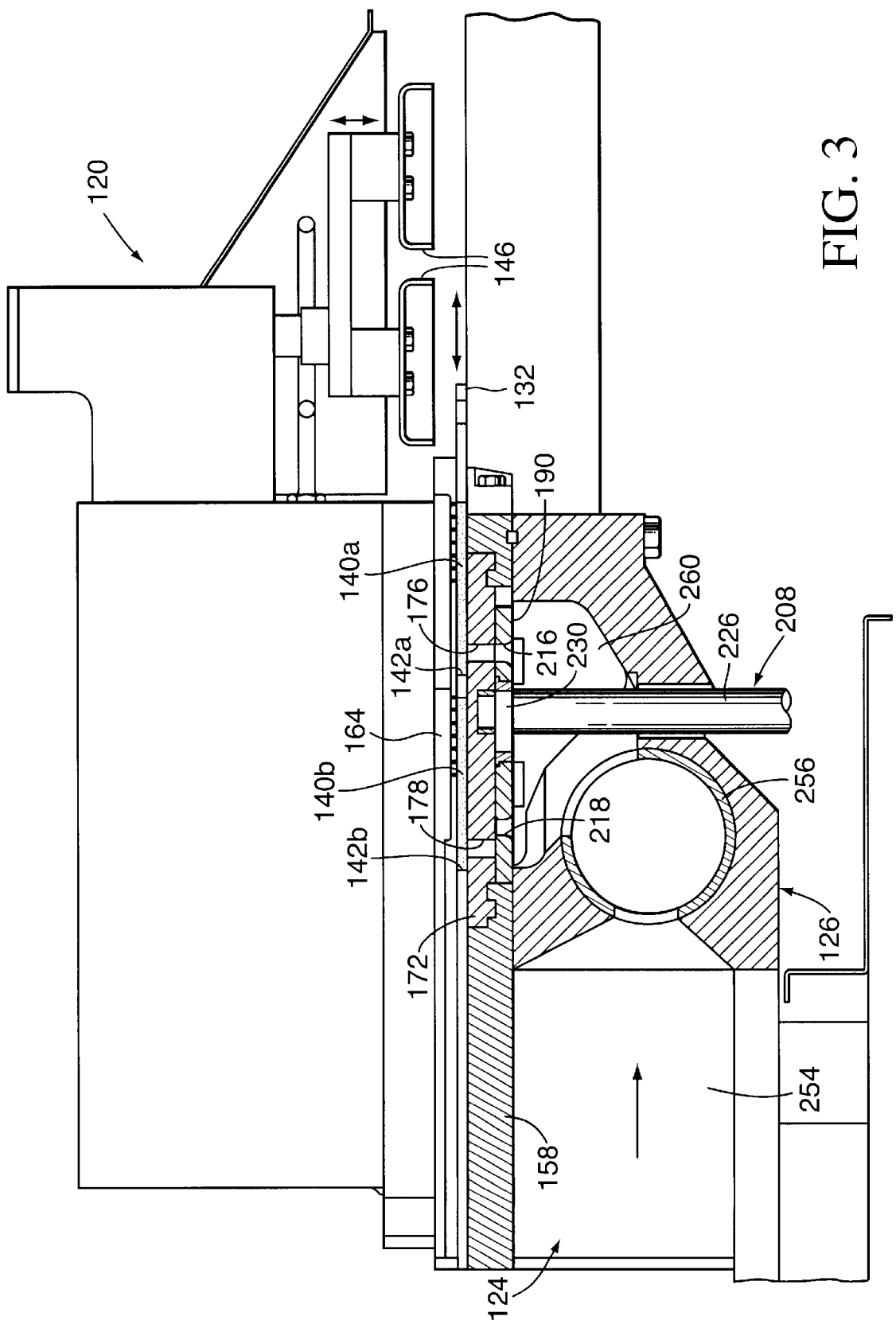
FIG. 3 is a diagrammatic sectional view of the apparatus shown in FIG. 2, but with the apparatus mold plate in a filling position.

The apparatus 120 is shown in FIG. 3 with the mold plate 132 in the completely retracted, fill position. At this position, the fill slots 176, 178 are in registry with the two rows of cavities 142a, 142b respectively. Additionally, in the fill position illustrated, the reciprocating mechanism 208 has moved the valve plate 190 to the left to cause a registry between the respective fill slots 176,178 and the valve slots 216, 218. Thus, pressurized food product can flow from the expanded fill passage 260 through the valve slots 216, 218, the fill slots 176, 178 and into the two rows of cavities 142a, 142b.

Figure 4:
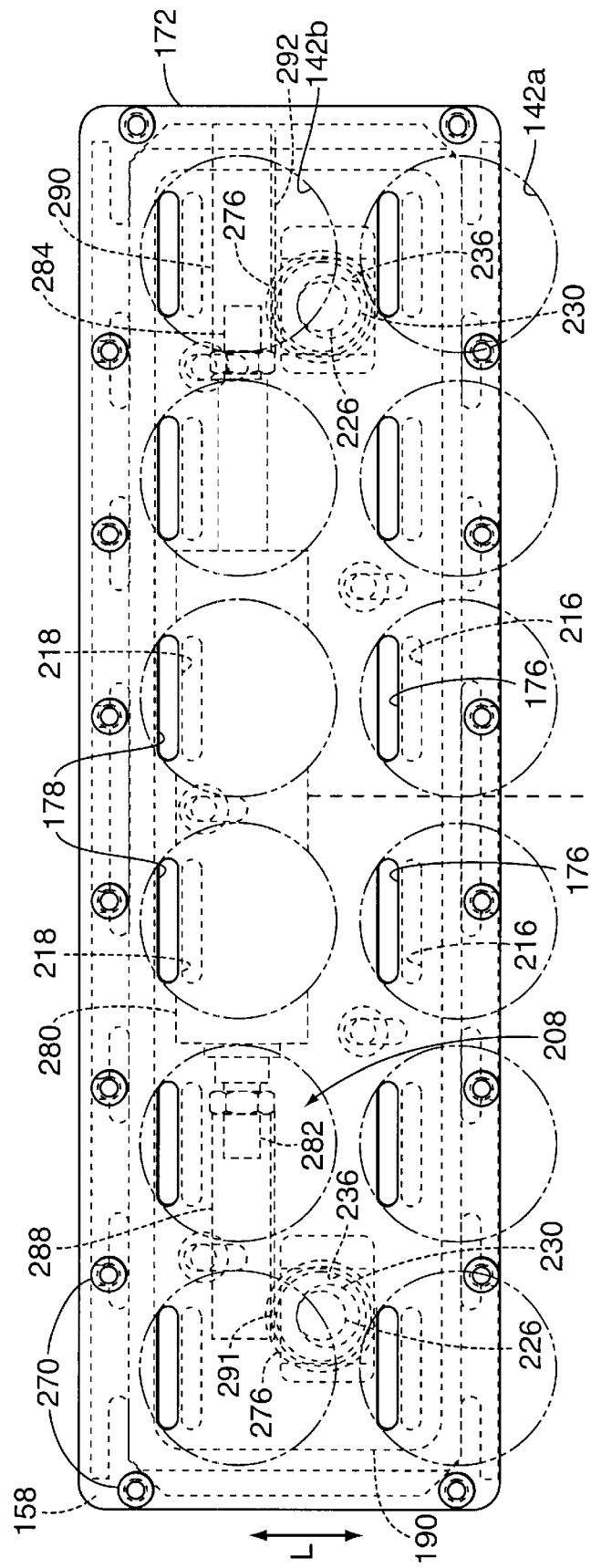
FIG. 4 is an enlarged, fragmentary, diagrammatic sectional view taken generally along line 4—4 of FIG. 2.

FIG. 4 illustrates the fill plate 172 overlying the valve plate 190. The two rows of cavities 142a, 142b of the mold plate 132 are shown in phantom in the fill position over the feed slot plate 172, for reference. According to the preferred embodiment, two rows of cavities 142a, 142b are utilized, each row having six cavities. It is of course encompassed by the invention that more rows, and/or more or less cavities per row, could be used.

The direction of reciprocation L is indicated on the left side of FIG. 4. The fill plate 172 is fixedly connected to the support plate 158 by a plurality of fasteners 270. The valve plate 190 is shown dashed and located below the fill plate 172. The reciprocation mechanism 208 includes two shafts 226 connected respectively to the two cams 230.

Referring to FIGS. 2 and 4, the shafts 226 are connected to gears 276 arranged below the cams 230. A two-way cylinder 280 is provided below the fill plate 172 and arranged extending laterally. The two-way cylinder 280 includes a first output shaft 282 and an opposite, second output shaft 284. The output shafts 282, 284 are fastened to an internal piston (not shown) of the cylinder 280 and are fastened externally thereof to racks 288, 290 respectively. The racks 288, 290 have toothed regions 291, 292 that are respectively enmeshed with the gears 276. Thus, when the piston within the cylinder 280 and the shafts 282, 284 move from right to left, the racks 288, 290 move from right to left which causes counterclockwise rotation of the gears 276, counterclockwise rotation of the shafts 226, and counterclockwise rotation of the cams 230. The cams 230 rotate within the bearings 236 which causes corresponding translation of the plate 190 along the reciprocation direction L. When the two-way cylinder 280 reverses direction and moves from left to right, the opposite translation of the valve plate 190 occurs. The cylinder 280 is controlled by the apparatus control C for synchronized oscillation.

As shown in FIG. 4, the fill slots 176,178 are not in registry with the valve slots 216, 218. The mold plate 132 shown in FIG. 4 is in the knock-out position or discharge position, as also shown in FIG. 2. When the reciprocating mechanism rotates the cams 230 180° from the position shown, the valve slots 216, 218 will be in registry with the fill slots 176,178 respectively, and the cavities 142a, 142b will be located as shown in phantom.

For simplicity, the valve slots 216 carry the same reference number across the transverse row of valve slots, and the valve slots 218 carry the same reference number across the second row of valve slots. Likewise, the fill slots 176 use the same reference number across the first row of fill slots, and the fill slots 178 carry the same reference number across the second row of fill slots.

Figure 5A:
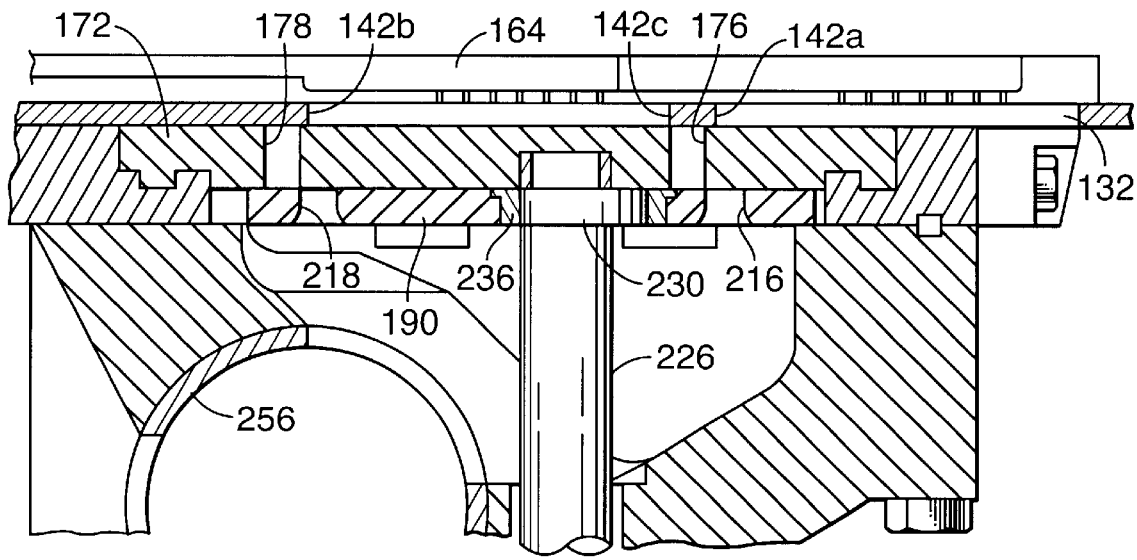
FIG. 5a is an enlarged, fragmentary, diagrammatic sectional view of the apparatus shown in FIG. 2 with the apparatus mold plate at an intermediate position between the knock-out position and the filling position.

FIG. 5a illustrates the mold plate 132 after having the patties 140a, 140b removed by the cups 146a, 146b and being retracted toward the fill position, at the last moment before the fill slots 176, 178 begin to register with the valve slots 216, 218, by action of the cams 230. At this point, a trailing edge 142c of the rearward cavity 142b has just passed the forward fill slot 176. The mold plate 132 is moving from right to left in FIG. 5a.

Figure 5B:
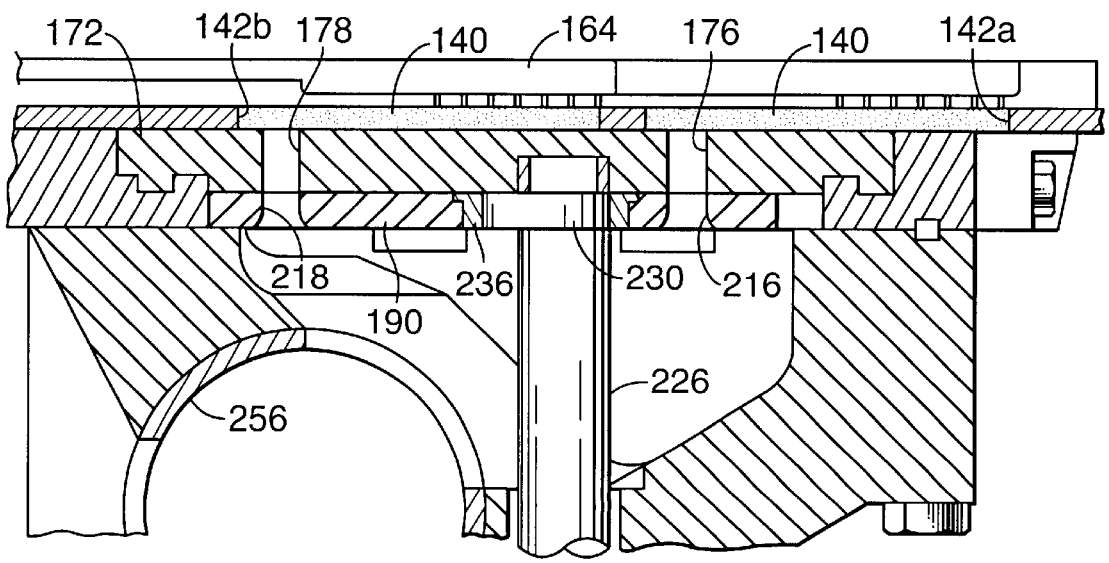
FIG. 5b is a fragmentary, enlarged, diagrammatic sectional view of the apparatus shown in FIG. 2 with the apparatus mold plate in a filling position.

FIG. 5b illustrates the fill position wherein the mold plate has moved from the position shown in FIG. 5a to its most retracted fill position of FIG. 5b. During the travel from the position shown in FIG. 5a to the position shown in FIG. 5b, the valve slots 216, 218 have moved to become fully in registry with the fill slots 176, 178 and pressurized food product has passed into the cavities 142a, 142b. After a dwell time in the position shown in FIG. 5b, the mold plate begins to translate toward the knock-out or discharge position.

Figure 5C:
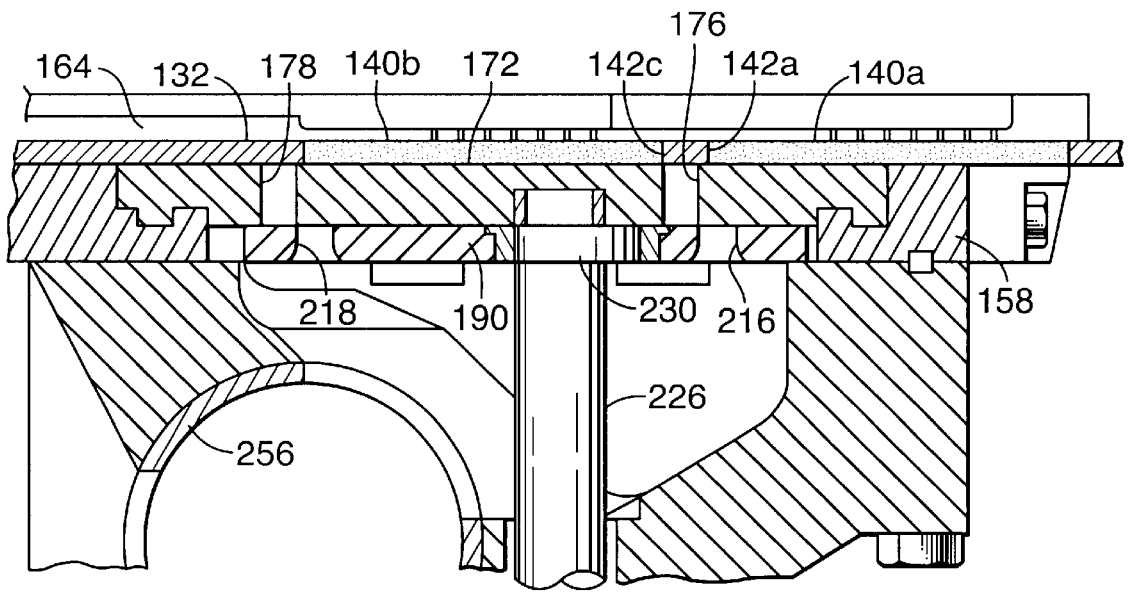
FIG. 5c is an enlarged, fragmentary, diagrammatic sectional view of the apparatus shown in FIG. 2 with the apparatus mold plate shown in an intermediate position between the filling position and the knock-out position.

In FIG. 5c the mold plate 132 is moving from the fill position toward the knock-out position. By the time the mold plate 132 has moved to the extent that the edge 142c of the rearward mold cavity 142b has reached the fill slot 176, the valve plate 190 has been shifted from left to right by the cam 230 such that the valve slot 216, 218 are closed off from the fill slots 176, 178, respectively. In this way, the rearward food patty 140b is not again subjected to a filling pressure from the fill slot 176 as it passes thereby.

As set forth in U.S. Pat. Nos. 4,356,595 and 4,821,376, and 4,372,008, the quality of the molded food patties can be improved by relieving the pressure on the food product and the pump cavity and in the fill passage throughout a substantial portion of the molding cycle. The valve plate 190 is also used to facilitate the control of the food product pressure. The preferred pressure relationship of the present invention is illustrated in FIG. 6 as a function of the mold plate cycle timing.

Figure 6:
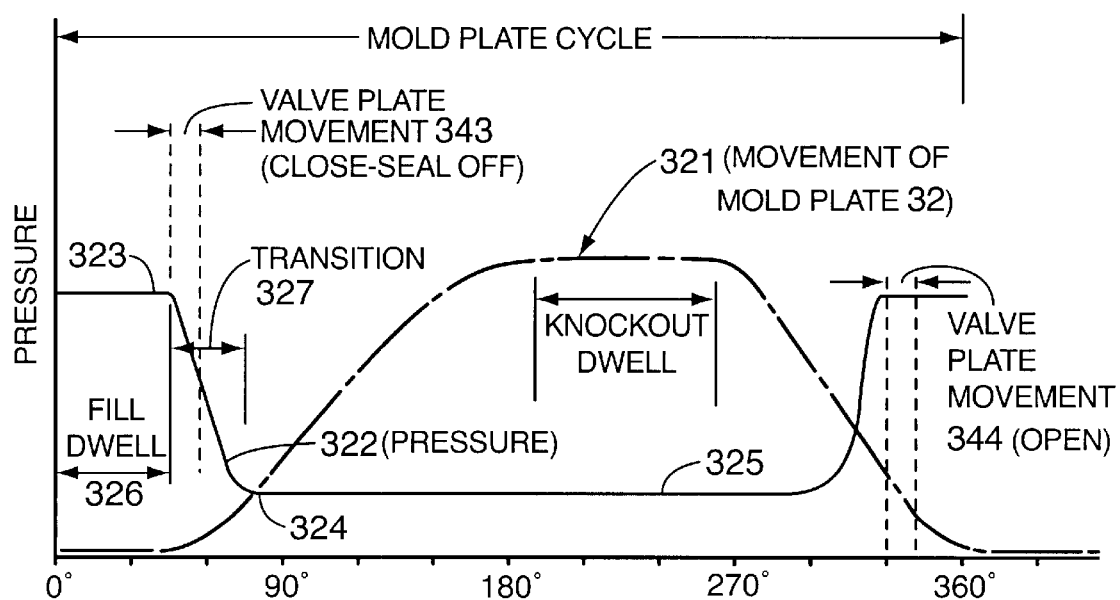
FIG. 6 is a chart of the mold plate and valve plate cycles for the apparatus of FIG. 2.

In FIG. 6, the phantom line curve 321 shows the cyclic movement of the mold plate 132. The solid line curve 322 illustrates the pressure applied to the food product in the fill passage 260 of the apparatus 120.

As indicated in FIG. 6, a given maximum fill pressure 323 is applied to the food product in fill passage 260 during the fill dwell interval 326, to assure complete filling of the mold cavities 142a, 142b. Immediately following the fill dwell interval 326, in a succeeding transition interval 327 in which mold plate 132 is moving away from its fill position but a part of each mold cavity 142 remains in communication with the fill slots, the pressure on the food product is reduced to an intermediate pressure 324 much less than the fill pressure 323. Typically, pressure 324 may be approximately 20% of fill pressure 323, though this value may vary depending upon the nature of the food product and the size and configuration of the mold cavities. Intermediate pressure 324 should be sufficient to preclude back flow of food product from the mold cavities into the fill passage 260 during the transition interval 327. This requirement can be met by maintaining intermediate pressure 324 in a range of about 10% to 50% of the maximum fill pressure 323, in most instances.

As also indicated in FIG. 6, the pressure on the food product is preferably retained at or below the intermediate pressure 324 during the remainder of the cycle. That is, during extended interval 325 until near the end of the mold cycle, pressure on the food product remains at, or below, intermediate pressure 324. The pressure relief interval 325 may be maintained through a major portion of the mold plate cycle.

FIGS. 2 through 5c illustrate the apparatus 120 having a fill plate 172 with a single oblong fill slot 176, 178 per each mold cavity 142a, 142b, and a valve plate also with a single oblong opening 216, 218 per each mold cavity 142a, 142b. However, for some food products, a multi-orifice fill opening into the molding cavities is preferred in order to achieve uniform patty texture and subsequent minimal cooking shrinkage. Accordingly, it is also encompassed by the invention to use a multi-orifice fill plate with an underlying multi-orifice valve plate as illustrated in FIGS. 7 through 12.

FIGS. 7 through 12 illustrate an alternate embodiment apparatus 330. The apparatus utilizes a perforated, multi-orifice fill plate 332 having fill orifices 333, recessed within slots 335, in lieu of the slotted fill plate 172 of the first described embodiment. The fill plate 332 is located in a position below the mold plate 132 and at least partially within a recess 337 on the support plate 158. The fill orifices 333 are open (via the slots 335) to a face of the cavities 142a, 142b in the fill position. A valve plate 340 is supported for horizontal reciprocal movement by the support plate 158 beneath the fill plate 332. The valve plate 340 includes valve orifices 342 which are registerable with the fill plate orifices 333 in a fill position of the valve plate 340.

Whereas in the first illustrated embodiment the valve plate 190 was arranged to translate longitudinally (along the direction of mold plate reciprocation), the valve plate 340 of the alternate embodiment is arranged to be translated laterally to register the valve orifices 342 with the fill orifices 333 or alternately to close the fill orifices 333 with solid portions of the valve plate 340.

It is however also encompassed by the invention to arrange the valve plate 190 of the first embodiment to reciprocate laterally, and to arrange the valve plate 340 of the second embodiment to reciprocate longitudinally.

To move the valve plate from a fill or open position to a closed position, a hydraulic cylinder 350 (shown schematically in FIGS. 8 and 10) can be used which is operationally connected to the valve plate 340. The hydraulic cylinder can be pneumatically driven or hydraulic fluid driven. The valve plate is guided to reciprocate horizontally between the fill plate 332 and the support plate 158, by force from the hydraulic cylinder 350. The hydraulic cylinder is controlled to create a cyclic or oscillating lateral force on the valve plate 340, synchronized with the reciprocation of the mold plate 132. In this regard, the hydraulic cylinder can be a bidirectionally acting cylinder ("two way cylinder") or can be a single direction cylinder ("one way cylinder") combined with a return spring. Alternatively, instead of a single hydraulic cylinder, multiple hydraulic cylinders can be used. Furthermore, other motive devices can be used such as a cam arrangement driven hydraulically or driven by an electric motor, or by a linear electric motor or positioner, or other known device. The operation and timing of the valve plate 340 is effectively the same as the operation described above associated with FIGS. 5a through 6.

The apparatus 330 includes a cover plate 360 overlying a top breather plate 362 and a bottom breather plate 364. The breather plates 362, 364 include breather holes 368, 370 arranged to register with the cavities 142a, 142b, respectively during filling of the cavities with food product, and breather channels 372, 374 in flow communication with the respective breather holes 368, 370. The breather holes 368, 370 and channels 372, 374 are used to remove air from the cavities during filling of the cavities with pressurized food product.

Figure 11:
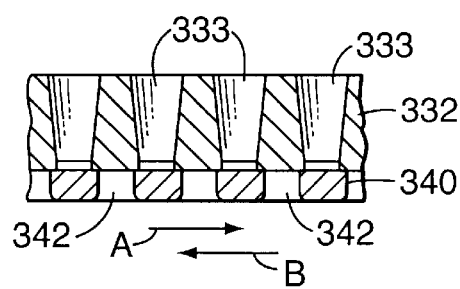
FIG. 11 is a diagrammatic sectional view taken approximately as indicated by lines 11—11 in FIG. 8, with the valve plate in a closed condition.
Figure 8:
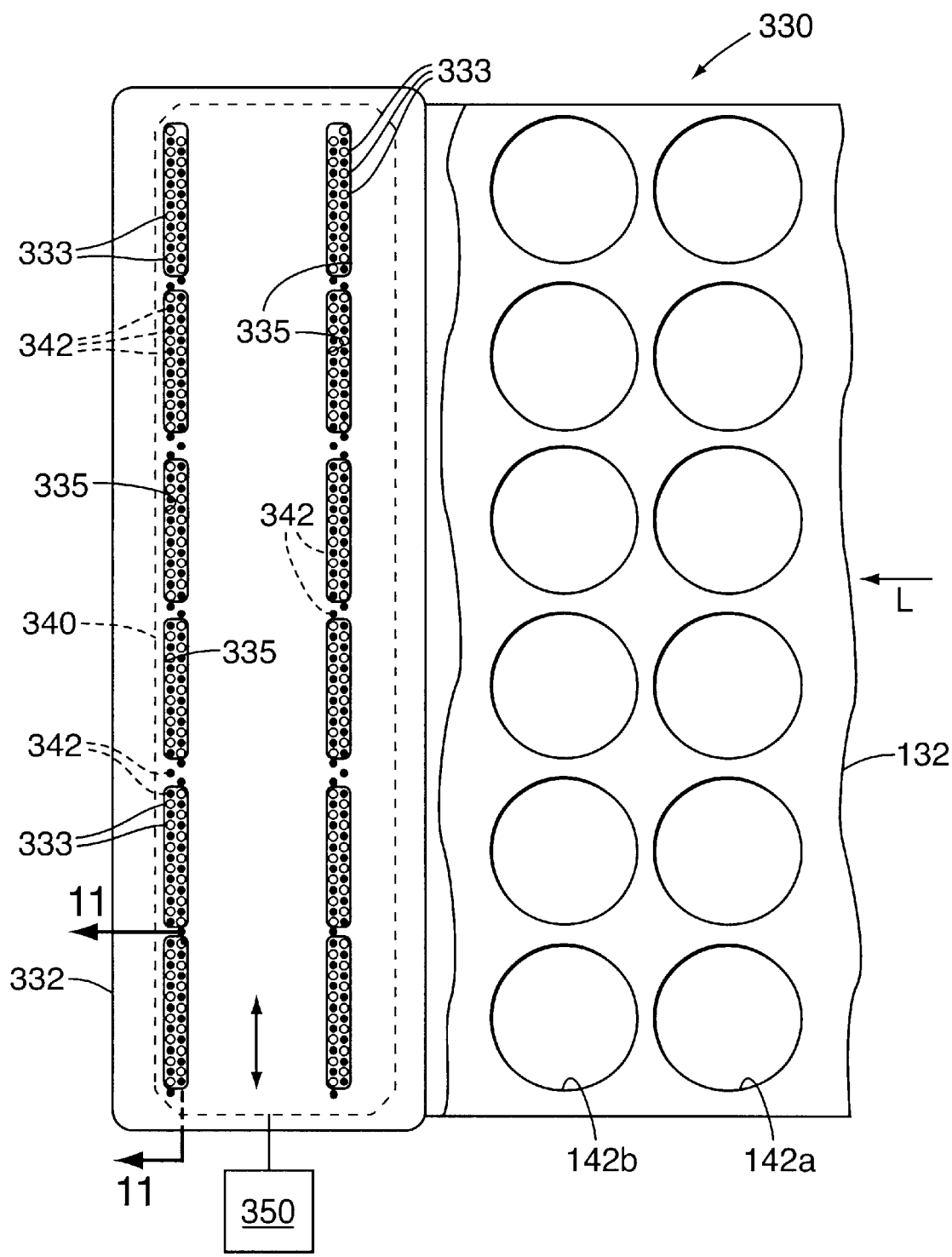
FIG. 8 is a diagrammatic plan view of the mold insert plate, mold valve plate and mold plate of FIG. 7, with the mold plate in the knock-out position.

FIGS. 7, 8 and 11 illustrate the apparatus 330 with the mold plate 132 in the discharge or knock-out stage or position. The knock-out cups 146a, 146b are shown in a downward position, having just discharged patties 140a, 140b from cavities 142a, 142b, respectively. The patties 140a, 140b can be deposited on a product conveyor 375 to move to a collection area for packaging. The fill plate orifices 333 (shown in FIG. 8 as open circles) are out of registry with the valve plate holes 342 (shown schematically in FIG. 8 as solid circles), i.e., the valve plate 340 is in the closed position.

Figure 12:
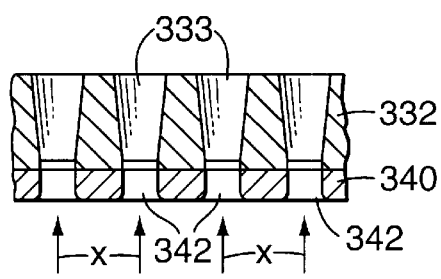
FIG. 12 is a diagrammatic sectional view taken approximately as indicated by lines 12—12 in FIG. 10, with the valve plate in an open condition.
Figure 9:
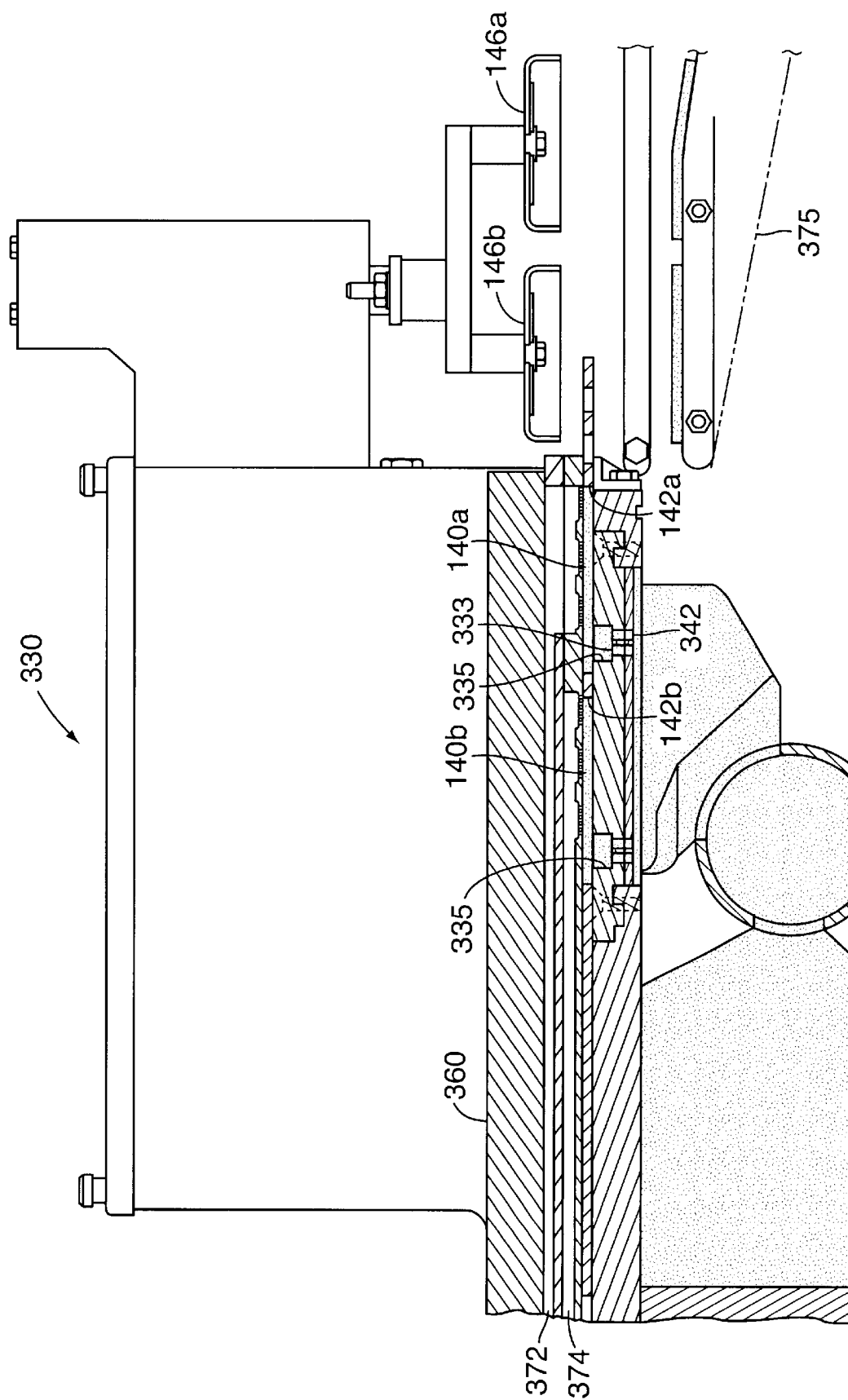
FIG. 9 is a diagrammatic sectional view of the food patty-forming apparatus of FIG. 7, with the apparatus mold plate in a retracted position.
Figure 10:
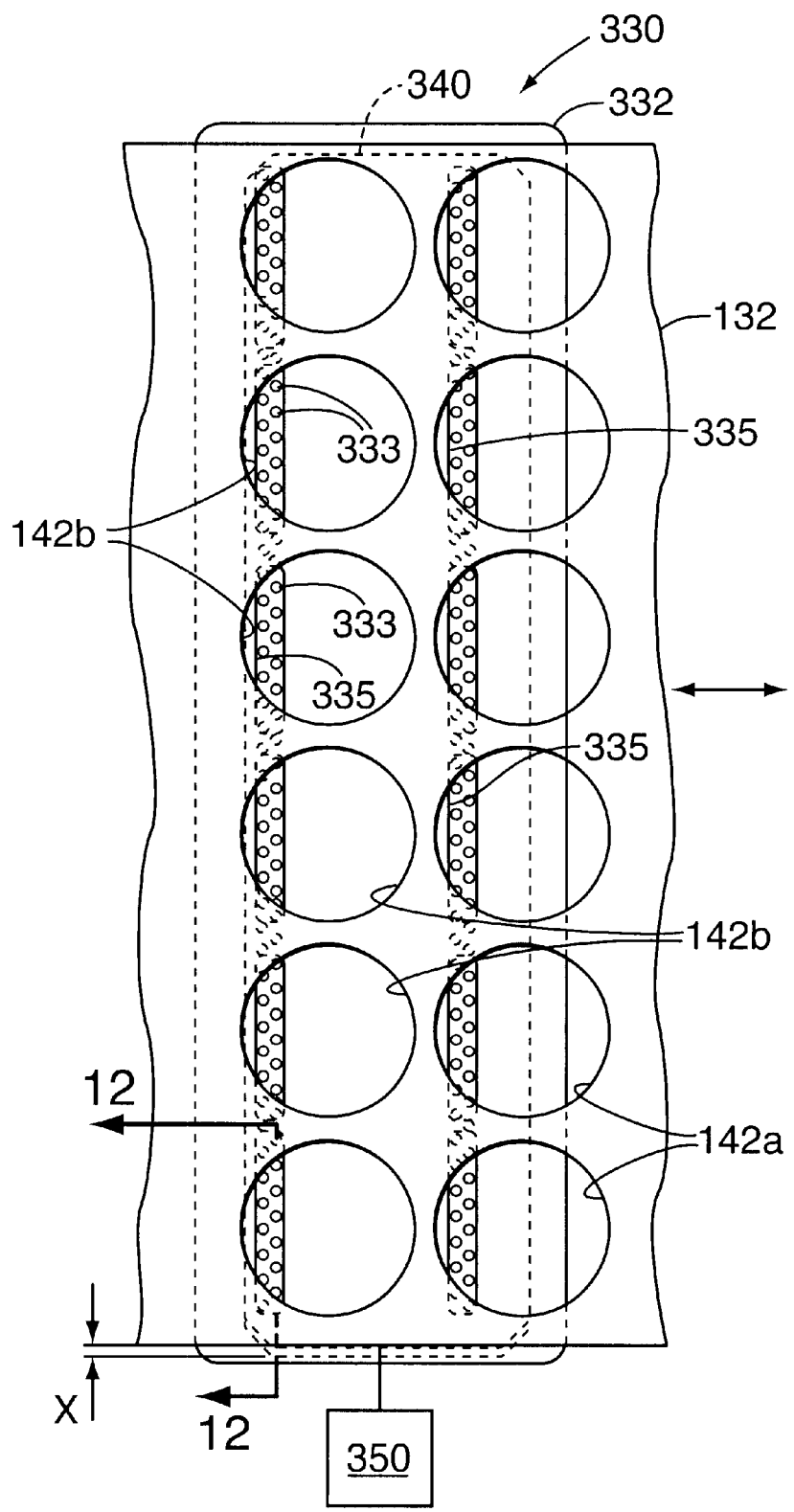
FIG. 10 is a diagrammatic plan view of the mold insert plate, mold valve plate and mold plate of FIG. 9, with the mold plate in the retracted position.

FIGS. 9, 10 and 12 illustrate the apparatus 330 with the mold plate 132 retracted in the fill stage or position. The valve plate 340 has been shifted laterally inwardly (upwardly in FIG. 10) by a distance x, and all of the valve plate holes 342 now register with, or are superimposed by the fill plate orifices 333. This shift establishes a flow path of pressurized food product from the fill passage 260, through the valve plate 340, through the fill plate 332, and into the cavities 142a, 142b.

FIG. 11 illustrates the relationship between the valve plate 340 and of the fill plate 332. The valve plate holes 342 are not in registry with the orifices 333 of the fill plate, i.e., the valve plate is in the closed position.

FIG. 12 illustrates the relationship between the valve plate 340 and of the fill plate 332 wherein the mold plate 132 is in the retracted position, and the valve plate is in the open position. The valve plate 340 has been shifted and the valve plate holes 342 to are in registry with the fill plate orifices 333.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A food product patty-forming apparatus, comprising:
a mold plate arranged to be reciprocated in a longitudinal direction between a forward, discharge position and a rearward, fill position, and having two rows of mold cavities through a thickness thereof, said rows extending in a lateral direction;

a food product delivery channel arranged on one side of the mold plate and having two rows of fill openings, a forward row of fill openings and a rearward row of fill openings that are openable to communicate food product into said two rows of cavities, respectively; and a valve plate arranged between said mold plate and said fill openings, said valve plate reciprocable to cyclically open and close at least said forward row of fill openings.

2. The apparatus according to claim 1, wherein said rows of cavities are straight rows.

3. The apparatus according to claim 1, wherein said valve plate is arranged to reciprocate in said longitudinal direction.

4. The apparatus according to claim 1, wherein said valve plate is arranged to reciprocate in a lateral direction.

5. The apparatus according to claim 1, comprising a mechanism for reciprocating said valve plate, said mechanism comprising a reversible piston/cylinder device and at least one cam in engagement with said valve plate, said reversible piston/cylinder device connected to said cam to rotate said cam, rotation of said cam causing reciprocation of said valve plate.

6. The apparatus according to claim 1, comprising a mechanism for reciprocating said valve plate, said mechanism comprising a pair of cams and a reversible piston/cylinder device connected to said pair of cams to rotate said cams, said pair of cams in engagement with said valve plate, and spaced apart laterally, to oscillate said valve plate upon rotation of said cams.

7. The apparatus according to claim 1, wherein said fill openings and said valve openings are elongated slots.

8. The apparatus according to claim 1, where said valve openings and said fill openings each contain plural orifices which communicate into each cavity.

9. A food patty-molding apparatus, comprising:

an apparatus frame;

a mold plate having at least two cavities and mounted to reciprocate with respect to said frame in a longitudinal direction to position said two cavities between a rearward, fill position and a forward, mold patty knockout position, said two cavities being aligned along the longitudinal direction;

a food product delivery channel mounted to said frame and having respective rearward and forward fill openings into said two cavities, when said mold plate is in said fill position; and a valve plate arranged between said mold plate and said fill openings, said valve plate reciprocable to selectively open and close at least said forward fill opening.

10. The apparatus according to claim 9, comprising a reciprocation mechanism which is configured to oscillate said valve plate.

11. The apparatus according to claim 10, wherein said reciprocation mechanism comprises a reversible piston/cylinder device and at least one cam in engagement with said valve plate, said reversible piston/cylinder device connected to said cam to rotate said cam, rotation of said cam causing reciprocation of said valve plate.

12. The apparatus according to claim 9, wherein said valve plate includes valve openings which are registerable with said fill openings.

13. The apparatus according to claim 12, wherein said valve openings have open areas coextensive with said fill openings.

14. The apparatus according to claim 12, wherein said fill openings and said valve openings are elongated slots.

15. The apparatus according to claim 12, wherein said valve openings and said fill openings each contain plural orifices which communicate into each cavity.

16. The apparatus according to claim 9, wherein said valve plate is reciprocable longitudinally in a direction of mold plate movement.

17. The apparatus according to claim 9, wherein said valve plate is reciprocable laterally of a direction of mold plate movement.

18. The apparatus according to claim 1, wherein said valve plate is reciprocable to selectively open and close both said rearward and forward rows of fill openings.

19. The apparatus according to claim 5, wherein said valve plate is reciprocable by said mechanism to selectively open and close both said rearward and forward rows of fill openings.

20. The apparatus according to claim 19, wherein said fill openings and said valve openings are elongated slots.

21. The apparatus according to claim 19, where said valve openings and said fill openings each contain plural orifices which communicate into each cavity.

22. The apparatus according to claim 11, wherein said valve plate includes valve openings which are registerable with said fill openings, wherein said valve openings have open areas coextensive with said fill openings.

23. The apparatus according to claim 22, wherein said fill openings and said valve openings are elongated slots.

24. The apparatus according to claim 22, wherein said valve openings and said fill openings each contain plural orifices which communicate into each cavity.

25. The apparatus according to claim 9, wherein said valve plate is reciprocable to selectively open and close both said rearward and forward fill openings.

26. The apparatus according to claim 11, wherein said valve plate is reciprocable by said mechanism to selectively open and close both said rearward and forward fill openings.

27. The apparatus according to claim 26, wherein said valve plate includes valve openings which are registerable with said fill openings, wherein said valve openings have open areas coextensive with said fill openings.

* * * * *